US012447401B1

(12) United States Patent
Teneyck

(10) Patent No.: US 12,447,401 B1
(45) Date of Patent: Oct. 21, 2025

(54) VIDEO GAME CONTROLLER

(71) Applicant: Daquan Teneyck, Hyattsville, MD (US)

(72) Inventor: Daquan Teneyck, Hyattsville, MD (US)

( * ) Notice: Subject to any disclaimer, the term of this patent is extended or adjusted under 35 U.S.C. 154(b) by 269 days.

(21) Appl. No.: 18/080,814

(22) Filed: Dec. 14, 2022

(51) Int. Cl.
*A63F 13/24* (2014.01)
*A63F 13/2145* (2014.01)

(52) U.S. Cl.
CPC .......... *A63F 13/24* (2014.09); *A63F 13/2145* (2014.09); *A63F 2300/1043* (2013.01); *A63F 2300/1075* (2013.01)

(58) Field of Classification Search
CPC ............................. A63F 13/24; A63F 13/2145
See application file for complete search history.

(56) References Cited

U.S. PATENT DOCUMENTS 6,512,511 B2 * 1/2003 Willner .................. A63F 13/24 348/E5.103
10,183,218 B1 1/2019 Strahle
10,357,712 B2 7/2019 Szmaj
2013/0102391 A1 * 4/2013 Kaldahl ................ A63F 13/211 463/36
2023/0099023 A1 * 3/2023 Konishi ................ A63F 13/214 463/37
2023/0149803 A1 * 5/2023 Ironmonger ............ A63F 13/22 463/37

* cited by examiner

*Primary Examiner* — Yingchuan Zhang
(74) *Attorney, Agent, or Firm* — Sanchelima & Associates, P.A.; Jesus Sanchelima; Christian Sanchelima

(57) ABSTRACT

A video game controller including a controller assembly, buttons assembly and a plug assembly. Controller assembly includes a left member and a right member where are configured to be attached and detached from each other by means of the plug assembly that comprises a male member that is configured to fit into a receiving member. Controller assembly further includes finger supports on a portion of the lateral edges, wherein the finger supports are configured to round a predetermined user's finger to provide a firm grasp to the controller assembly. Buttons assembly provides a left touchscreen and a right touchscreen placed on a portion of the left member and right member respectively, which are configured to mimic the interface of a smarthphone touch-screen. Buttons assembly further includes a plurality of programmable buttons placed along the body of the controller assembly that permits to interact with a videogame while pressed.

10 Claims, 4 Drawing Sheets

VIDEO GAME CONTROLLER

1. FIELD OF THE INVENTION

The present invention relates to a game controller and, more particularly, to a video game controller that includes a touchpad to mimic the interface of a touchscreen display.

2. DESCRIPTION OF THE RELATED ART

Several designs for video game controllers have been designed in the past. None of them, however, include a touchpad and/or touchscreen in a front portion of the video game controller, mimicking the interface of a smartphone touchscreen, wherein the video game controller is capable of being split into a right member and a left member.

Applicant believes that a related reference corresponds to U.S. Pat. No. 10,357,712 issued for computer game controller. Applicant believes that another related reference corresponds to U.S. Pat. No. 10,183,218 issued for detachable joystick for video game controller. None of these references, however, teach of a video game controller having a touchscreen input to mimic the interface of a smartphone.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device that replaces the joystick of a well-known video game controller preventing lags due to said joystick.

It is another object of this invention to provide a video game controller that provides more accuracy while gaming.

It is still another object of the present invention to provide a split video game controller providing a more comfortable gaming manner and hand relief.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
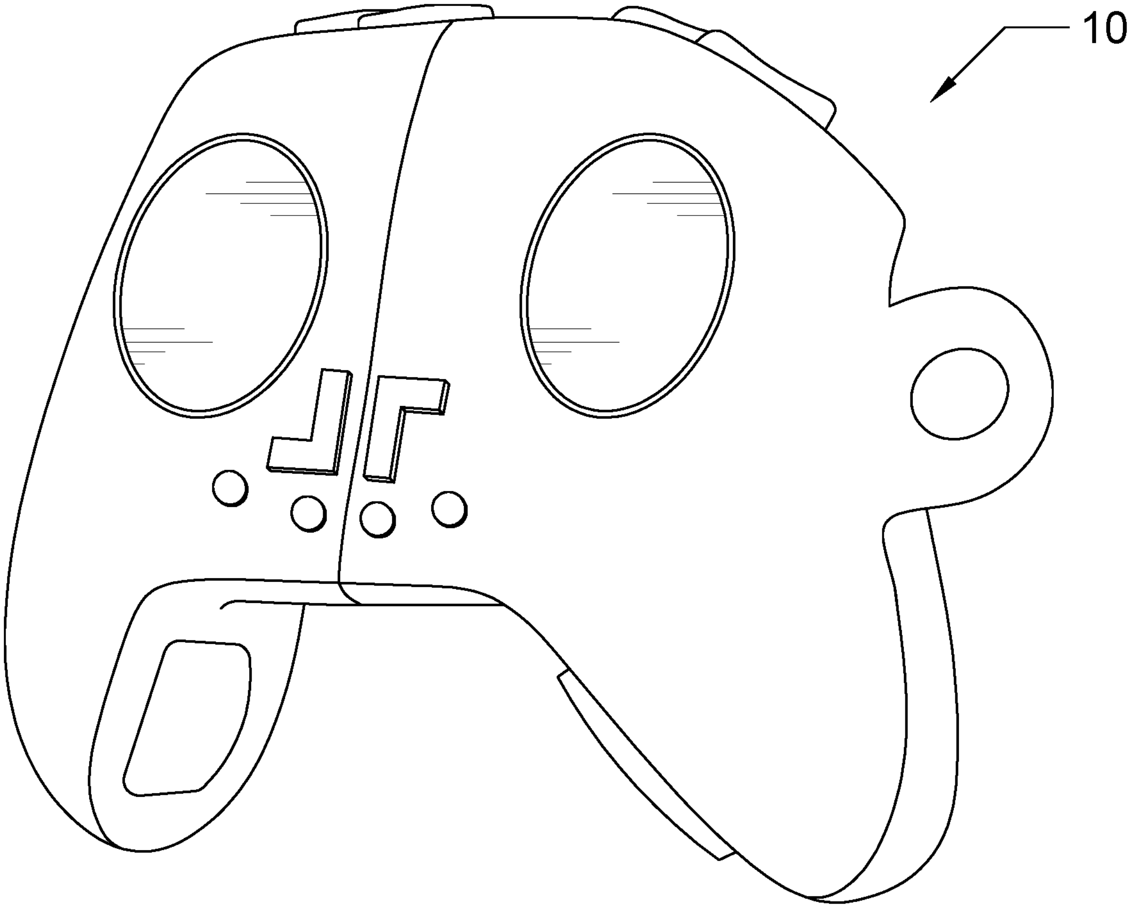

With the above and other related objects in view, the invention consists in the details of construction and combination of parts as will be more fully understood from the following description, when read in conjunction with the accompanying drawings in which:

FIG. 1 represents an isometric view of an exemplary embodiment of the present invention 10.

Figure 2:
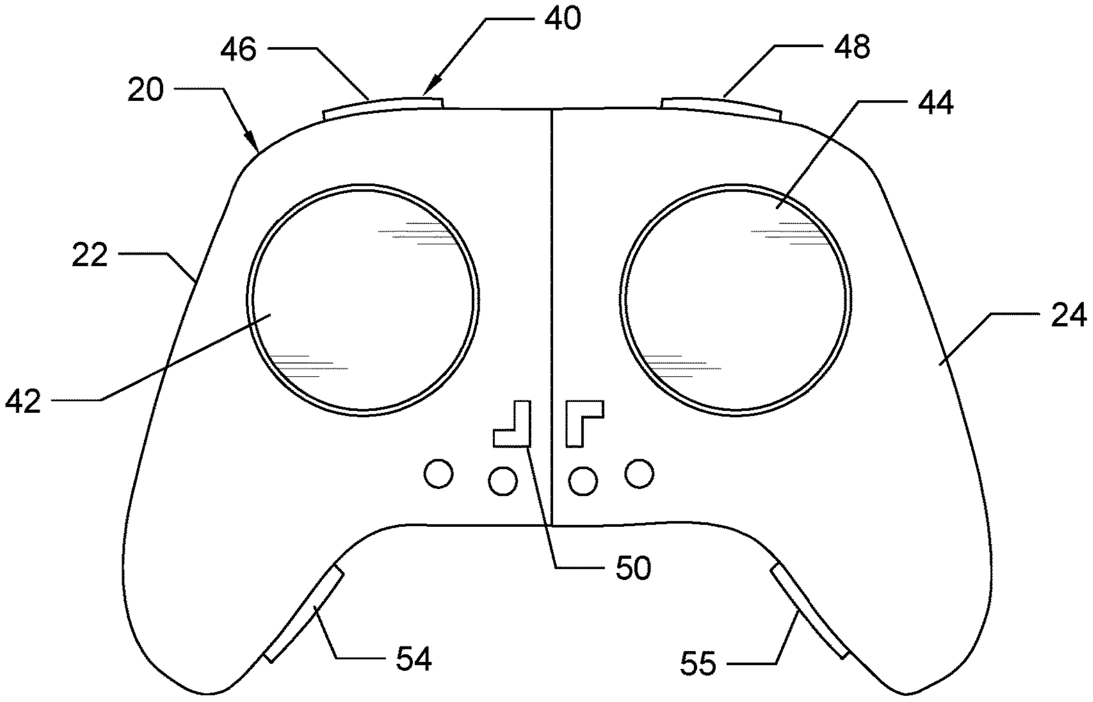

FIG. 2 shows a front view of the controller assembly 20, wherein the left touchscreen 22 and the right touchscreen 24 are placed in a front portion thereof.

Figure 3:
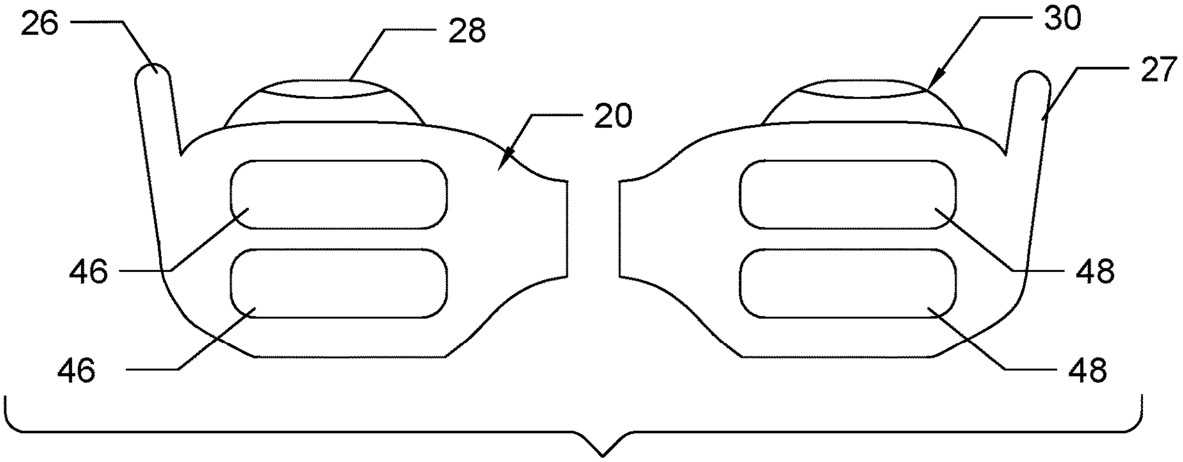

FIG. 3 illustrates a top view of the control assembly 20, wherein the left bumper 46 and a plurality of bumpers 46*a* are placed in a top portion of the left member 22, the right bumper 48 and a plurality of bumpers 48*a* are placed in a top portion of the right member 24.

Figure 4:
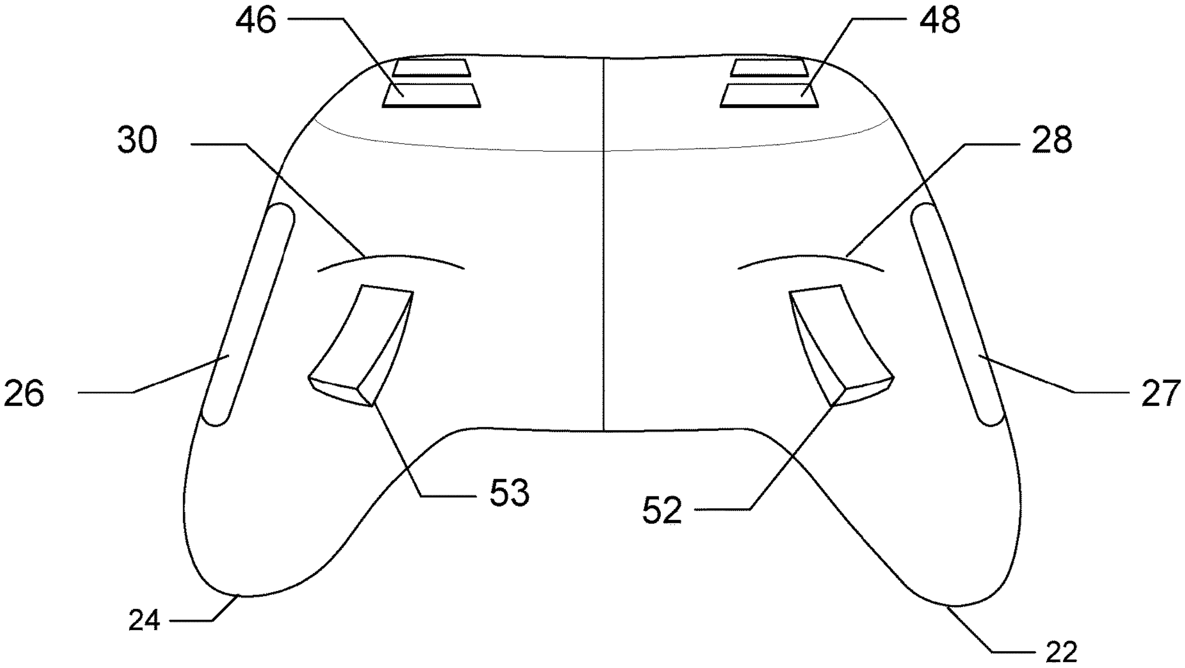

FIG. 4 is a representation of a rear view of the present invention 10, wherein the trigger 52 and the plurality of triggers 52*a* are placed in a rear portion thereof, and a left finger rest 28 and a right finger rest 30 are above the trigger 52 and the plurality of triggers 52*a* respectively.

Figure 5:
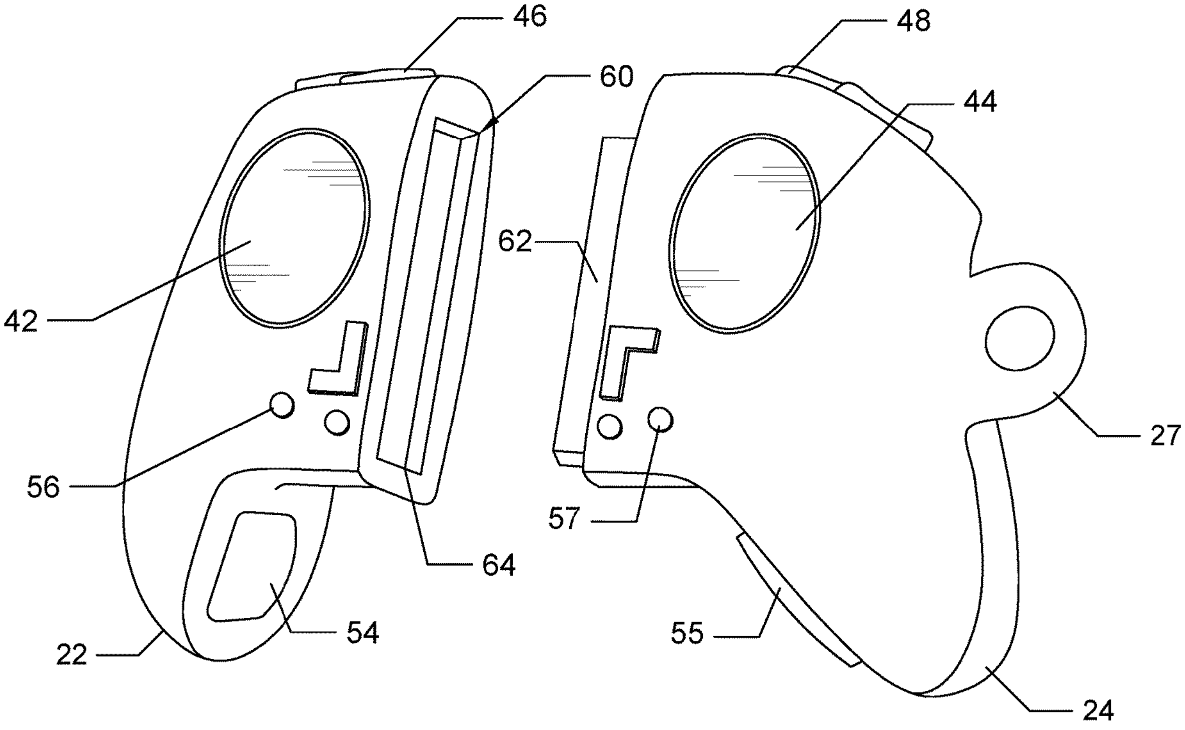

FIG. 5 depicts an isometric view of a suitable variation of the present invention 10 while split.

V. DETAILED DESCRIPTION OF THE EMBODIMENTS OF THE INVENTION

Referring now to the drawings, where the present invention is generally referred to with numeral 10, it can be observed that it basically includes a control assembly 20, a buttons assembly 40, and a plug assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Control assembly 20 includes a left member 22, a right member 24, a left finger support 26, a right finger support 27, a left finger rest 28 and a right finger rest 30. In an exemplary embodiment, the left member 22 may have a grip with an ergonomic shape that is configured to be handle by a user's hand, wherein the left member has a first middle portion that is configured to be attached to a second middle portion of a right member 24 As FIG. 2 represents. In a suitable embodiment, the left member has a hollow body, wherein circuitry and/or electronic elements may be housed therein. In a preferred embodiment, the left member 22 is made of a hard plastic material, a silicone material, a carbon fiber material, or any other suitable material in the art. Referring to FIG. 3, left member 22 has a top portion, wherein the top portion may be curved with a transition shape to conform with the shape of the grip of the left member, as shown in FIG. 2, nonetheless in a suitable variation, the top portion of the left member 22 may be flat, round or any other suitable shape. According to the embodiment represented in FIG. 4, left member 22 may have a rear side according to the front side thereof, wherein the grip included in the left member 22 conforms a suitable shape to be handle by the user's hand by means of the front side, a left lateral side and rear side, wherein the right lateral side has a flat surface. As shown in FIG. 2. In preferred embodiment, the front side, and the rear side of the middle portion of the left member 22 may be flat with a transitional curve toward the grip of the left member. The middle portion of the left member 22 has a straight lateral side and a straight bottom side, wherein the straight bottom side includes a transitional shape to conform the shape of the grip of the left member. As shown in FIG. 5. In one embodiment, left finger support 26 is placed at the rear side of the left member 22, wherein the left finger support has a ring shape embedded into the left member. In a preferred embodiment, left finger support 26 has a symmetrical geometry with respect to right finger support 27 of FIG. 5. In a suitable embodiment, left finger support 26 is configured to receive at least one of the user's fingers, wherein the left finger support is oriented conforming the curved shape of the left member. As depicted in FIG. 4. In other embodiment, the left finger rest 28 may be placed in a rear side of the left member 22. As illustrated in FIG. 3. The left finger rest 28 may have a curved shape and may be embedded into the left member. As illustrated in FIG. 4. In a preferred embodiment, the left finger rest 28 may be embedded in a portion of the rear side of the left member 22, wherein the left finger rest 28 is adapted to support at least one of the user's fingers, thereby said finger that pass through the left finger support 26 may be placed on the left finger rest 28 for support.

Referring to the figures, it should be considered that the right member 24 may have an identical geometry with respect to left member 22 according to FIG. 2, wherein the right member 24 includes a right finger support 27 placed at the opposite edge with respect to the left finger support 26. Best depicted in FIG. 4. In a suitable embodiment, right member 24 includes in a rear side thereof a right finger rest 30, as shown in FIG. 3, wherein right finger rest 30 is placed in the same axis with respect to the left finger rest 30. As shown in FIG. 4. It should be considered that the left member 22, left finger support 26, and left finger rest 28 may be configured to be handled by a left user's hand, wherein the right member 24, right finger support 27, and right finger rest 30 may be adapted to be handled by a right user's hand.

Buttons assembly 40 includes a left touchscreen 42, a right touchscreen 44, a plurality of left bumpers 46, a plurality of right bumpers 48, a D-pad 50, a left trigger 52, a right trigger 53 and a left programmable button 54, a right programmable button 55, a plurality of left programmable buttons 56 and a plurality of right programmable buttons 57. In an exemplary embodiment, left touchscreen 42 may be placed in a front portion of the left member 22, wherein the left touchscreen 42 may have a circular shape. As best depicted in FIG. 2. Nonetheless, a square shape, a rectangular shape, a regular shape, an irregular shape, or any other variation thereof may be suitable for left touchscreen. In a suitable embodiment, left touchscreen 42 may be an electronic display screen adapted to be touch-controlled by using the fingers, wherein the left touchscreen 42 may be an input device that mimics the interface of a smartphone well known in prior art. Nevertheless, it should be considered that left touchscreen 42 may be an input pad that is adapted to interact with the user's fingers, mimicking the interface of the touchscreen input device of the smartphone. In a suitable embodiment, the plurality of left bumpers 46 may be placed in the top portion of the left member 22, wherein the plurality of left bumpers 46 may have a rectangular shape with rounded corners. As best illustrated in FIG. 3. Nevertheless, it should be considered that a square shape, a rectangular shape, a regular shape, an irregular shape, or any other variation thereof may be suitable for the plurality of left bumpers 46. In a preferred embodiment, the plurality of left bumpers 46 may be a switch mechanism that is actuated when pressed. The plurality of left bumpers 46 may be embedded into the top portion of the left member 22, wherein a portion of plurality of left bumpers 46 extend past from said top portion. As shown in FIG. 2. In other embodiment, the D-pad 50 may be placed on a front portion of the middle portion of the present invention 10. As illustrated in FIG. 1. In a preferred embodiment, the D-pad 50 may be divided in two portions, wherein a first portion is embedded into the left member 22, and a second portion embedded into the right member 24. As best depicted in FIG. 5. D-pad 50 may have a cross design divided in two portions, wherein a first portion of the D-pad 50 has a L-shape inverted from right to left and a second portion of the D-pad 50 has a L-shape inverted from up to down. As FIG. 2 represents. In a preferred embodiment each portion of the D-pad 50 may include two switch buttons placed at the edges of each portion of the D-pad 50. In a suitable embodiment a portion of the D-pad 50 may extend past from the front portion of the middle portion of each left member 22 and right member 24. As shown in FIG. 5. In a suitable embodiment, the left trigger 52 is placed in the rear side of the left member 22, wherein the left trigger may be placed below the left finger rest 28. As best illustrated in FIG. 4. In a preferred embodiment, the left trigger 52 may include spring mechanism therein where is actuated by pressing it by means of a user's finger, said left trigger 52 may return to its original position when released. The left trigger 52 may have right triangle-shaped with a curved transition as a hypotenuse. Best depicted in FIG. 4. In an exemplary embodiment, the left programmable button 54 may be embedded in the straight lateral side of the left member 22, wherein a portion of the left programmable button 54 may extend past from said straight lateral side of the left member 22. As best illustrated in FIG. 2. In one embodiment, the left programmable button 54 may have a square shape with rounded corners, nevertheless it should be considered that left programmable button 54 may have a rectangular shape, an oval shape, a circular shape, or any other suitable shape. The left programmable button 54 may be a switch mechanism that is actuated when pressed. In a preferred embodiment, the plurality of left programmable buttons 56 is embedded in a portion of the front side of the left member 22, wherein a portion of the plurality of left programmable buttons 56 extend past for the front side of the left member 22. As shown in FIG. 5. In a suitable embodiment, the plurality of left programmable buttons 56 may have a circular shape, a square shape, a rectangular shape, or any suitable variation thereof. The plurality of left programmable buttons 56 may be a switch mechanism that is actuated when pressed.

Referring to the figures, it should be considered that the right touchscreen 44, the plurality of right bumpers 48, the right programmable button 55, and the plurality of right programmable buttons 57 may be embedded symmetrically with respect to the left member 22. As shown in FIG. 2. The right trigger 53 may be embedded symmetrically with respect to the left trigger as FIG. 4 illustrates. In a preferred embodiment the right touchscreen 44, the plurality of right bumpers 48, the right trigger 53, the right programmable button 55, and the plurality of right programmable buttons 57 may have a symmetrical shape with respect to respective elements placed on the left member 22, nevertheless it should be considered that a variation of the elements below described may have a suitable variation.

Plug assembly includes a male connector 62 and a receiving connector 64. In an exemplary embodiment, the male connector 62 may be placed in a lateral side of the right member 24, wherein the male connector 62 may have a protruded portion that extends past for said lateral side. Best depicted in FIG. 5. The male connector 62 may have a rectangular shape, in a suitable embodiment, the receiving connector 64 may be a receiving portion that conforms with the shape of the male connector 62. Best depicted in FIG. 5, thereby the male connector fits into the receiving connector 64, allowing the left member 22 being assembled with the right member 24. As shown in FIG. 2.

It should be considered that the elements included in the buttons assembly 40 may be operatively connected to a circuit board, circuitry, or the like included inside the control assembly 20, wherein the buttons assembly 40 may be powered by means of a battery included into the circuit board, wherein the present invention 10 may be operatively connected to a smartphone, a video game console, a computer or any other suitable device.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A video game controller, comprising:

a controller assembly, including a left member, a right member, wherein said left member and said right member are configured to be attached and detached from each other, said left member has an ergonomic grip that is adapted to be handle by a user's hand, said right member has a symmetrical shape with respect to said left member, wherein each of said left member and said right member includes a curved transition shape between a top portion and a grip portion to provide enhanced ergonomic handling;

buttons assembly having a right touchscreen, a left touchscreen, and a plurality of programmable buttons, wherein said left touchscreen is placed on said left member, said right touchscreen is placed on said right member, wherein said left touchscreen and said right touchscreen have substantially the same size and are centrally positioned on their respective members; wherein said left touchscreen and said right touchscreen have a circular shape to facilitate thumb operation, a plurality of buttons are placed along a surface of said left member and said right member; and a plug assembly including a male connector and a receiving connector, wherein said receiving connector is included in a lateral side of said left member, said male connector is included in a lateral side of said right member, wherein said male connector has an extended cuboid shape that engages with said receiving connector to provide a secure connection between said left member and said right member when attached.

2. The video game controller of claim 1, wherein said left member has a grip with an ergonomic shape that is configured to be handled by a user's hand, wherein said left member has a first middle portion that is adapted to be attached to a second middle portion of a right member.

3. The video game controller of claim 2, wherein said first middle portion includes said lateral side of said left member, wherein a top side has a curved shape with a transitional curve to conform said ergonomic shape of said grip.

4. The video game controller of claim 2, wherein said middle portion has a straight bottom side, wherein said straight bottom side has a transitional curve in an edge thereof to conform with said ergonomic shape of said grip.

5. The video game controller of claim 1, wherein said right member includes a grip with an ergonomic shape, said right member includes said second middle portion, wherein said right member and said middle portion are symmetrical with respect to said left grip and said first middle portion.

6. The video game controller of claim 1, wherein said left member and said right member includes a finger support, wherein said finger support is placed at the lateral edges of said grip of said left member and said right member, said finger support has a ring shape, wherein said ring shape is configured for a user's finger pass through thereof, and wherein said finger support is embedded into said left member and said right member.

7. The video game controller of claim 1, wherein said left member and said right member includes a finger rest placed at the rear side of said left member and said right member, wherein said finger rest is configured to support a user's finger, and wherein said finger rest has a curved shape and is embedded into said left member and said right member.

8. The video game controller of claim 1, wherein said male connector has an extended portion, wherein said extended portion has a cuboid shape.

9. The video game controller of claim 1, wherein said receiving connector includes a receiving portion, wherein said receiving portion has a cuboid shape that conforms with said cuboid shape of said male connect, thereby said male connector is configured to fit into said receiving connector.

10. A video game controller, consisting of:

a controller assembly, including a left member, a right member, wherein said left member has an ergonomic grip with a first middle portion, said ergonomic grip is adapted to be handle by a user's hand, first middle portion has a straight lateral side, another lateral side of said first middle portion has a transitional shape to conform the shape of said ergonomic grip, said left member has a curved top side, wherein said curved top side has a transitional shape to conform with said ergonomic shape of said ergonomic grip by means of one edge while another edge thereof has a straight shape to conform with said straight lateral side shape, said first middle portion has a straight bottom side, wherein said straight bottom side has a transitional curve in an edge thereof to conform with said ergonomic shape of said ergonomic grip, said left member includes a finger support, wherein said finger support is placed at the lateral edges of said ergonomic grip of said left member and, said finger support has a ring shape, wherein said ring shape is configured for a user's finger pass through thereof, said left member further includes a finger rest placed at the rear side of said left member, wherein said finger rest is configured to support a user's finger, said finger rest having a curved shape embedded into the rear side of said left member, said right member has a symmetrical shape with respect to said left member, said left member and said right member are configured to be attached and detached from each other by means of the first middle portion of said left member and a second middle portion of said right member;

buttons assembly having a right touchscreen, a left touchscreen, and a plurality of programmable buttons, wherein said left touchscreen is placed on said left member, said right touchscreen is placed on said right member, said left touchscreen and said right touchscreen are electronic display screens that are used as input devices to mimic the interface of a mobile phone, said left touchscreen and said right touchscreen have a circular shape, a plurality of buttons are placed along a surface of said left member and said right member, said plurality of programmable buttons are push buttons with a predetermined shape, buttons assembly further includes a D-pad, a left trigger, a right trigger, a left programmable button, a right programmable button, a plurality of left bumpers, a plurality of right bumpers, said D-pad is placed in a front side of said left member and said right member, said D-pad has a cross-shape divided in two, one portion of the cross-shape is placed on said left member and another portion of said cross-shape is placed on said right member, wherein said D-pad has an L-shape inverted from right to left on the left member and an L-shape inverted from up to down on the right member, said left trigger and said right trigger are placed in a rear side of said left member and said right member respectively, said left trigger and said right trigger having a right triangle-shaped form with a curved transition as a hypotenuse, said plurality of left bumpers are placed in said top side of said left member, said plurality of right bumpers are placed on a top side of said right member, said left programmable button and said right programmable button are placed in on said grip below said first middle portion and said second portion respectively; and a plug assembly including a male connector and a receiving connector, wherein said receiving connector is included in a lateral side of said left member, said male connector is included in a lateral side of said right member, wherein said receiving connector includes a receiving portion, wherein said receiving portion has a cuboid shape that conforms with said cuboid shape of said male connect, thereby said male connector is configured to fit into said receiving connector.

* * * * *